United States Patent [19]

Pei

[11] 4,048,983
[45] Sept. 20, 1977

[54] SOLAR ENERGY COLLECTOR APPARATUS

[75] Inventor: Yu Kun Pei, Toledo, Ohio

[73] Assignee: Owens-Illinois, Inc., Toledo, Ohio

[21] Appl. No.: 682,817

[22] Filed: May 3, 1976

[51] Int. Cl.² .............................................. F24J 3/02
[52] U.S. Cl. .................................. 126/271; 165/142; 350/293; 350/299
[58] Field of Search .............. 126/270, 271; 237/1 A; 240/41 SB, 41 L, 41.3, 41.5, 7.1 R; 350/293, 294, 299; 165/166, 142

[56] References Cited

U.S. PATENT DOCUMENTS

| 761,596 | 5/1904 | Moss | 126/271 |
|---|---|---|---|
| 1,424,932 | 8/1922 | Moreau | 126/271 |
| 1,575,309 | 3/1926 | Anderson | 126/271 |
| 1,696,003 | 12/1928 | Harvey | 126/271 |
| 3,952,724 | 4/1976 | Pei | 126/271 |

Primary Examiner—Kenneth W. Sprague
Assistant Examiner—James C. Yeung
Attorney, Agent, or Firm—J. R. Nelson

[57] ABSTRACT

The disclosure relates to a three piece solar energy bulb type collector device comprising a hollow glass body shaped with a parabolic interior surface that is coated with specular finish of a metal, e.g. silver, and includes an apex aperture and integral hollow yoke. A glass test-tube like element is exteriorly coated with a wave length selective coating having more than 0.8 absorption above 2.5 microns wave length and less than 0.1 emission at 2.5 microns or less wave lengths. The coated glass tube is the absorber and has an intermediate rib and flared open end which are fused with glass at the aperture area and open end of the yoke. The absorber is coaxially located with the focal axis of the parabolic surface. A cover plate is sealed over the large end of the parabolic body enclosing the interior mirror surface area in a chamber which is placed under vacuum (evacuated). Working media, which may be either gas or liquid, is circulated from a manifold through the absorber tube to remove solar energy as heat, and is returned to the manifold. The solar energy laden media is available for heating, cooling or power generating applications.

18 Claims, 4 Drawing Figures

SOLAR ENERGY COLLECTOR APPARATUS

The present invention relates to a solar energy collector apparatus for collecting energy from the rays of the sun on an absorber surface and exchange of the collected energy as heat to a working media, such as air or water, circulated through the apparatus. More particularly, the invention relates to a bulb-type solar collector unit having a parabolic mirror surface positioned to face the sun and a tube-type absorber whose axis is on the focal axis of the parabola of the mirror surface.

THE INVENTION RELATED TO THE PRIOR ART

Although parabolic reflector devices of this general type have been disclosed in the prior art, for example see U.S. Pat. Nos. 1,575,309 (1926); 2,460,482 (1949) and 3,130,084 (1964), the present invention is directed to a vacuum sealed unit having essentially all glass parts in the construction and possessing improved thermal properties. Since the unit is subjected to a range of temperature variations (heating and cooling of the parts thereof), the sealed together parts perform in a superior manner due to the glass construction thereof. In other words, the assembly of glass parts has a nearly uniform thermal coefficient of linear expansion and contraction providing a practical and durable unit in operation.

By encasing the absorber element of the apparatus in a vacuum within the parabolic glass reflector, heat loss through convection and conduction is reduced to a minimum. Furthermore, to reduce heat loss by radiation or re-radiation, the exposed surface of the absorber element is minimized.

The collector apparatus of this invention is a parabolic focusing type of solar collector that is suited for residential dwellings or "homeowner" uses, as well as for the larger demand type installations. The collector of this invention is capable of providing operating temperatures high enough to develop mechanical power, i.e. through hot water, steam or the like.

The collector of the present invention being constructed of glass parts, may be manufactured and assembled by utilizing conventional equipment, such as glass forming equipment suitable for pressing and blow molding glass articles.

SUMMARY OF THE INVENTION

The solar collector element comprises a two-piece molded glass bulb-type envelope which has an interior parabolic specular reflecting surface and a separate coated glass absorber tube located inside the bulb envelope on the focal axis of a paraboloid of revolution. The front facing area of the bulb is covered by a transparent glass cover plate which may be nearly flat or curved, depending upon the desired installation. The absorber tube is made from glass tubing closed at one end and assembled in the yoke of the bulb envelope along the focal axis of the parabolic reflector. The space within the face plate and bulb envelope is sealed along the mating perimeter of the cover plate and around the absorber tube in the yoke of the envelope. The interior of the sealed bulb envelope is evacuated to a vacuum condition. The exterior surface of the glass absorber tube has an opaque coating of a solar energy absorbing material of a type hereinafter disclosed to absorb the solar energy focused thereon by the parabolic reflector surface. The tubular absorber has its innermost end closed and the opposite outer end open. The glass wall of the bulb at the apex oriented yoke region is fused in a glass-to-glass seal with the exterior of the glass absorber tube forming the sealed unit. The open end of the absorber tube is directed outside the parabolic reflector, so to speak, through the yoke at the apex of the bulb. The assembled collector is a sealed container unit of the type disclosed in my copending application Ser. No. 682,705, filed on May 3, 1976. This invention provides a practical solution to radiation heat loss by using a vertically disposed tubular absorber member of short length disposed along the axis of a parabolic reflector surface of relatively large surface area.

A manifold of the apparatus delivers a working heat exchange media, such as air or water, into the open end of the absorber tube for circulation therein to its closed end and back to the open end thereof and into the manifold. There is disclosed in connection with the collector of the invention two illustrated forms of media circulation via manifolds. One manifold involves an arrangement best suited for circulating a gaseous media, such as air, along a path through a number of the bulb collectors. The other manifold involves a parallel arrangement best suited for circulating a liquid media, such as water, through a plurality of the collectors.

The face of each collector includes a glass face plate. The faces of the bulb collectors will, of course, be arranged on a plane facing the sun. Several of the bulb collectors may be arranged in an array and interconnected to form a facing or impervious surface at the sun facing plane, thereby providing a curtain wall or roofing effect for the installation. From the standpoint of appearance in a wall or curtain of the collectors, the face plates should be nearly flat or planar, however, the bulbs are under a heavy vacuum and to achieve a greater strength-to-weight ratio for a given bulb size, a domed or curved face plate is preferable.

The bulb collectors are assembled onto a manifold apparatus by inserting an outwardly depending hollow yoke thereof into an aperture formed in the manifold. The yoke is sealed in the manifold aperture by rubber ring gasket or ring grommet seals.

The fluid from the manifold is circulated into and along the length of the absorber tube of the bulb and back into the manifold by fluid handling means extending into the hollow absorber tube. Circulation of the working fluid through each of the bulb collectors continuously removes the heat energy of the solar radiation collected on the absorption surface of the absorber tube. The solar radiation is focused onto the absorber tube surface by the mirrored specular parabolic surface on the interior face of the glass body. Relatively high temperatures may be developed in the working fluid by the apparatus of this invention.

Other advantages of the invention will be more readily apparent to those skilled in the art from the following detailed description of the drawings, on which:

DESCRIPTION OF THE INVENTION

Figure 1:
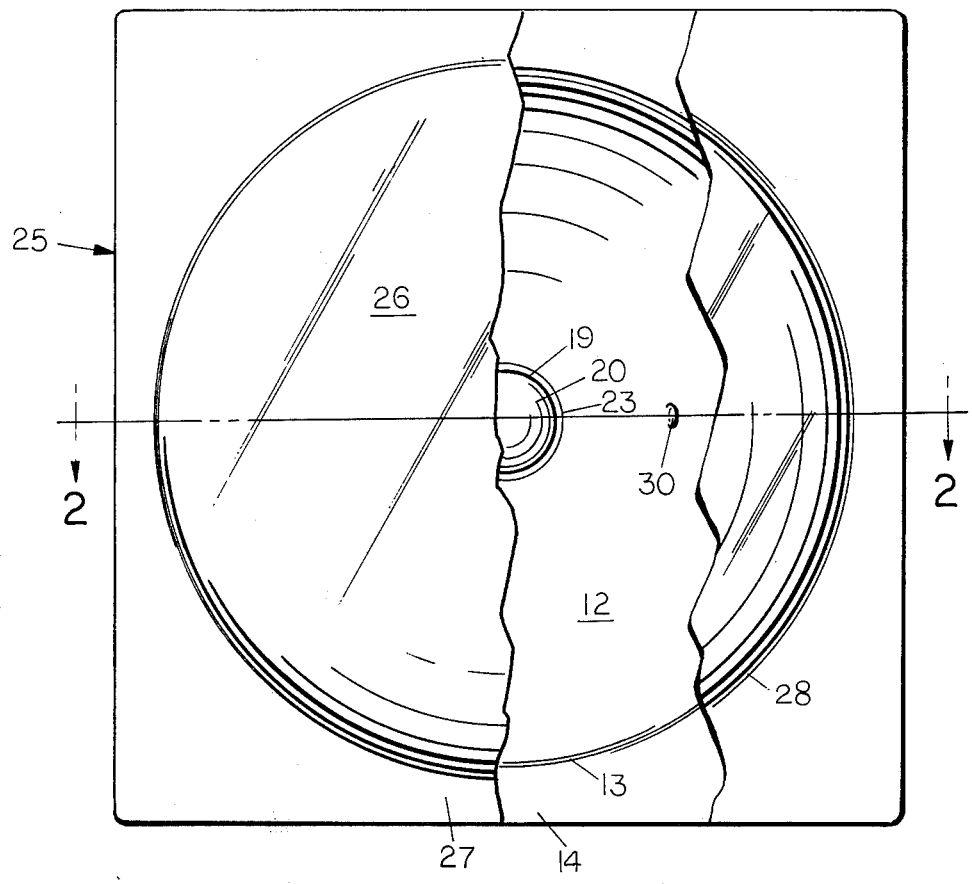
FIG. 1 is a top plan view, with parts broken away, showing the collector apparatus of the invention.
Figure 2:
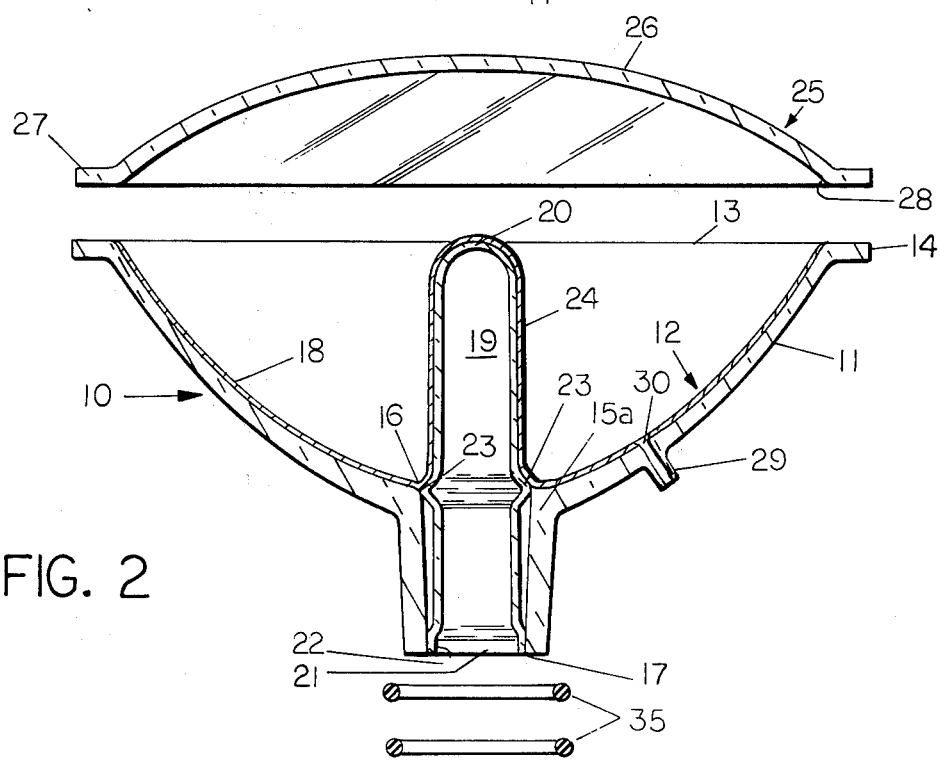
FIG. 2 is an exploded sectional elevational view taken along line 2—2 on FIG. 1.

Referring to FIGS. 1 and 2, a bulb body 10 is molded, such as by pressing, centrifugal casting or pressing and blowing glass in a mold (not shown) to form an annular glass wall 11 defining on its interior surface 12 a paraboloid of revolution generated about a central axis which is the focal axis for surface 12. This surface 12 may be in the form of parabolic segments joined together about the central focal axis. This surface of whichever of such forms is herein called a "parabolic surface". At the one end of the glass body wall 11 is a large end opening defined by the peripheral edge 13. An outwardly projecting peripheral flange 14 depends from edge 13 which encircles the collector body 10. Along the axis at the apex of the parabolic surface 12, there is a tubular wall extension which is the yoke portion 15 of the glass body. The one end 15a of yoke 15 is integral with the glass wall of the parabolic portion and defines an aperture 16 concentrically disposed about the focal axis of the parabolic surface 12. The outer open end 17 of yoke 15 provides the means of which the collector is connected onto a manifold system, to be hereinafter described.

The glass body 10, just described, is treated to receive a thin specular coating 18 of silver, or the like, over the parabolic surface 12 to form a specular mirror finish throughout the parabolic surface to the aperture 16. The highly efficient coating 24 on the absorber tube further reduces radiation losses and retains the energy on the absorber tube 19. The bulb collector unit is highly efficient for collection of the energy of the sun's rays. Circulation of working media through the interior of the absorber tube, such as described hereinafter, exchanges the absorbed heat of the sun's energy which is carried by the media. The wave length selective coatings should have the property of very high absorption (preferably more than 0.8 absorption in wave lengths above 2.5 microns) and very low emission (preferably less than 0.1 emission in the infra-red wave lengths, less than 2.5 microns).

The coated tubular absorber member 19, just described, is then assembled along the central axis of the body 10 (focal axis of surface 12). As shown on FIGS. 2-4, the tubular absorber 19 is inserted open end first through aperture 16 and into yoke 15. Flared end portion 22 engages the inner wall surface of yoke 15 near the end 17 thereof and rib 23 engages (or nearly so) the glass of wall 11 adjacent the perimeter of aperture 16. Glass of flared end 22 is preferably fused with the glass of the yoke wall adjacent its open end 17. The glass in rib 23 is similarly fused with the glass of wall 11 around aperture 16. The tubular solar absorber element 19 is now connected in place in the collector bulb assembly.

A glass tubular wall member 19 is formed from drawn glass tubing and prior to assembly the one end 20 thereof is worked and closed in a more or less test tube configuration. The opposite open end 21 of member 19 may include a flared portion 22 to approximately the O.D. corresponding with the I.D. of open end 17 of yoke 15 of the glass wall body. Additionally, before assembly, the tubular wall of member 19 may be worked upon heating to the softening point of the glass or higher to form an annular rib-like enlargement 23 the same O.D. or slightly larger than the diameter of the aperture 16 at the end 17 of yoke 15. The tubular member 19 will next be coated, preferably along its exterior surface inclusive of the closed end 20 thereof. As will be seen upon the assembly, this coating need extend only over the wall surface above the aperture 16 in the body, thus a coating layer 24 is applied beginning at about annular rib 23 and upwardly over the closed end 20 of the tubular wall of member 19.

The coating layer 24 takes the form of a highly efficient solar energy absorbing coating, e.g. a wave length selective coating. The tubular glass member 19 with the coating 24 thereon comprises the absorber tube of the collector. The absorber tube will be disposed axially (vertically) in the unit aimed with its axis generally aimed at the sun. The absorber is of small surface area compared to the relatively large surface area of the parabolic reflector surface 12. This contributes greatly to a minimal radiation heat loss from the unit by having the absorber of small surface area.

A face plate or cover plate 25 is formed of transparent glass and includes a circular outwardly domed section 26, and an integral peripheral flange 27. The perimeter of the inner edge 28 of the domed section of the face plate approximately matches the circular edge 13 on the bulb body, and the flange 27 overlies the peripheral flange 14 thereof. Inasmuch as the bulb interior is under vacuum, the convex cover plate adds strength to the assembly. However, a flat cover plate may be used with success.

As seen on FIGS. 1 and 2, a tubulation 29 is formed on the glass wall 11 of the bulb which includes an aperture 10. The bulb and face plate are now assembled and securely fastened or joined together at the matched flanges 14, 27. This is most conveniently done by fusion of the two flanges of glass. The interior space or chamber within the bulb is next evacuated by connecting a vacuum pump at tubulation 29 and combined with a bake out the interior of the bulb collector is drawn down to a vacuum of $10^{-4}$ torr or more; whereupon, tubulation 29 is tipped off and sealed in the known manner (see bulb 10 on FIG. 3). The vacuum chamber within the bulb collector reduces the convection and conduction of heat losses of the unit.

Figure 3:
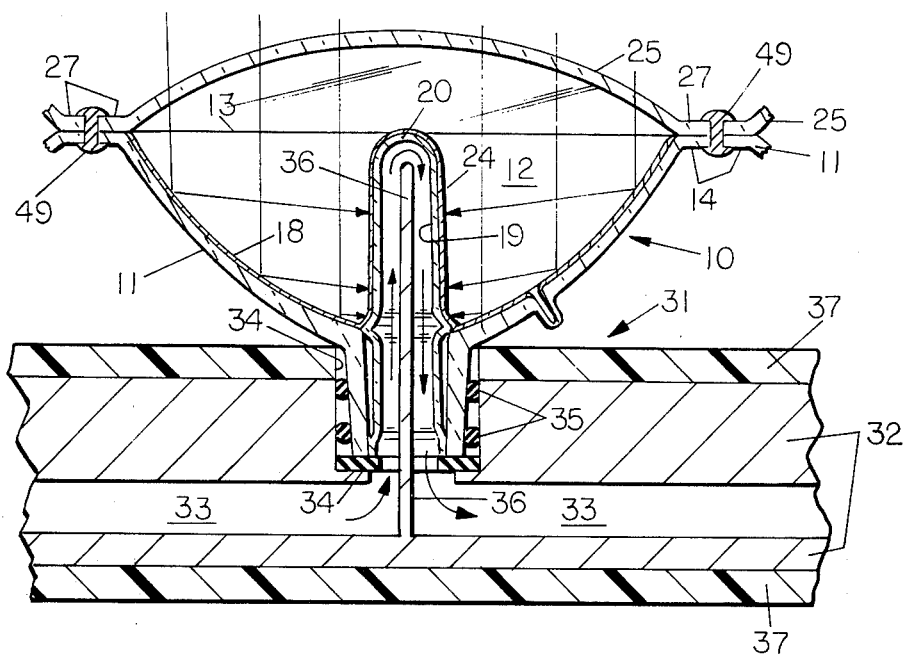
FIG. 3 is a sectional elevational view of the collector apparatus of FIG. 2 installed as a series in a manifold according to one embodiment of the invention.
Figure 4:
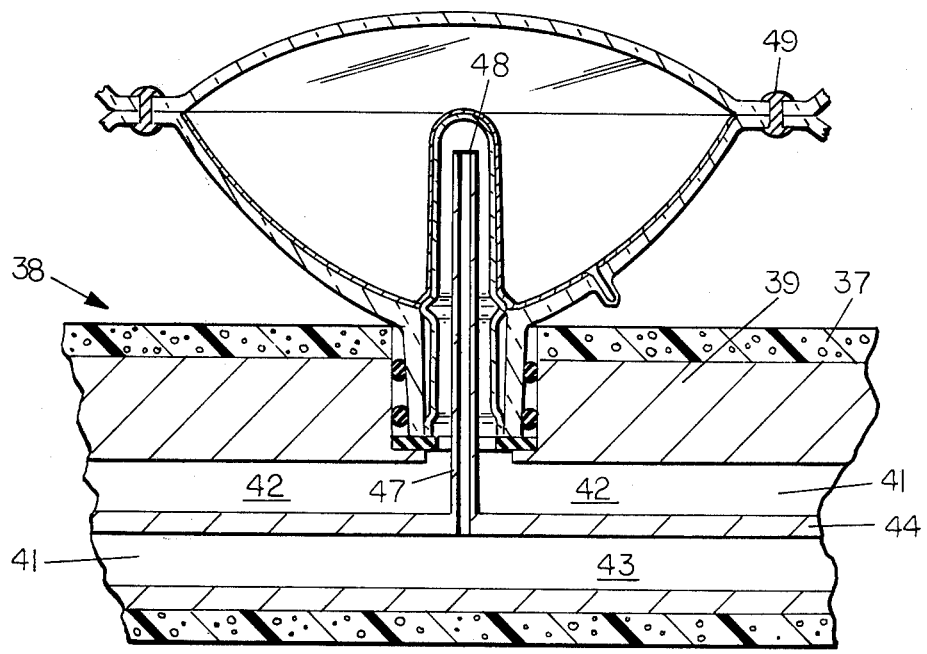
FIG. 4 is a sectional elevational view like FIG. 3, but with parts broken away, showing a second embodiment of the invention in connection with a different manifold.

As shown on FIGS. 3 and 4, several of the bulb collectors may be assembled onto a manifold connected in a system for circulating a working medium, i.e. air or water. The manifold may take several forms, one of which is illustrated on FIG. 3 and a second form is illustrated on FIG. 4 (to be described later herein).

MANIFOLD OF FIG. 3

As shown on FIG. 3, the one form of manifold circulates the working media, such as a gas, in a series path through adjacent solar collectors 10 placed therealong. Manifold 31 includes a wall 32 which defines a passage or conduit 33. A series of apertures, such as 34, extend through the wall 32 for receiving yoke 15 of the bulb collectors. In the wall of each of these apertures 34, there is provided plural annular grooves or seats to receive the O-rings 35 which seal the glass yoke 15 in the manifold. The bulb collectors are pressed into the apertures on assembly such that the end 17 of the yoke is about even with conduit 33; or may be pulled vertically therefrom in disassembly, as needed for maintenance and repair to the bulb collectors in the installation. Thus, the solar collector installation may be made at the dwelling or the site of use in a simplified manner with a minimal use of tools and fixtures. The working fluid media is circulated through the collectors, as seen by the arrows on FIG. 3, by vertical partition members 36 which depend upwardly from the floor of conduit 33. The partitions are of a shape so that they fit snugly inside the hollow chamber of the absorber tube 19 in a diametrical placement such that the interior space of each absorber tube is approximately bisected. Partition members 36 are spaced from the interior of closed end 20 of the absorber tube allowing counterflow circulation of the media through the inside of the absorber tube. The flow may be in either direction, the media flow on FIG. 3 being indicated from left to right.

Manifold 31 also includes a complete exterior layer 37 of sufficient thickness of an insulation, such as a foamed (cellular) polyurethane or the like. Preferably, the exposed exterior of insulation layer 37 is coated or painted with a sealer, such as a plastic or paint, to close any cellular structure and provide a more durable exterior to the unit.

As may be seen, for example as illustrated by the ray lines on the bulb of FIG. 3, the sun's rays pass through the face plate and strike either the energy absorbing surface 24 of the absorber tube or strike the mirror surface 18 of the parabolic reflector 12. The rays impinging upon the mirror surface of the parabolic reflector are reflected to the focal axis of parabolic surface 12 whereat they strike the coated outer surface of the tubular absorber. The vacuum in the space inside the bulb prevents loss of energy from convection and conduction.

MANIFOLD OF FIG. 4

As may be seen on FIG. 4, another form of manifold is shown, which may be similarly connected with an array of collector bulbs. Working media, such as a liquid, is circulated from the manifold into each of the bulbs by a means to be described so that the bulbs are serviced in a parallel arrangement. Liquid media is suggested as the form in this arrangement, however, gaseous media may be substituted.

The manifold 38 is comprised of a top wall 39 and bottom walls 40 and opposed side walls 41 which define a conduit that is divided longitudinally into upper and lower passageways 42 and 43 respectively, by a central wall 44 extending sidewise of the conduit from opposite side walls 41. The apertures 34 in wall 39 receive the yoke 15 of a bulb collector which is sealed in the manifold as described before. Working media is connected from the lower passageway 43 into the interior chamber of the absorber tube 19 by a delivery tube 47 which has its upper open end 48 spaced from the closed end 30 of the absorber. Flow of the working media is shown by the arrows on FIG. 4, in which cooler media flows from passage 43 into the absorber and exchanges heat with the glass wall 19. The heated media returns to passsageway 42. Similarly, as described on FIG. 3, the manifold is encased in a suitable layer of insulation material 37, such as foamed (cellular) polyurethane insulation grade material.

As indicated on FIGS. 3-7, the bulb collectors may be utilized as a curtain wall installation that affords resistance to weather and the like. The several bulb collectors may be placed in side-by-side arrangements with their sealed together flanges 14, 27 abutting one another. A suitable grouting compound or cement 49 is forced in the seams around the flanges sealing the exposed plane of the collectors from leakage, which produces run off of snow and rain or the like to keep the curtain wall from sun masking obstructions, etc. The cement 49 seals the seams, such as shown on FIG. 3 in section. Various pattern effects or layouts may be obtained by variations in the geometric configurations of the perimeter flanges 14, 27 of the bulb collectors. In the example given in FIG. 1, the flanges are square shaped at their periphery. The bulbs may be installed in rows on a straight manifold channel in each row and selected manifold "straights" interconnected for flow of the working media. The flange areas are preferably kept as small as practical to obtain the most exposure of the sun's rays on face plate areas of the curtain wall.

Having illustrated and described several embodiments of the invention herein, it should be understood that further modifications may be resorted to without departing from the spirit of the invention and scope of the appended claims.

What is claimed is:

1. A solar collector apparatus comprising an integral endless glass wall defining a parabolic surface disposed about a central focal axis, an aperture at one end of said wall centered on said axis at the apex of said parabolic surface, the opposite end of said wall defining an enlarged open end, a continuous reflective coating layer over the parabolic surface of said wall for reflecting solar radiation striking said surface to said focal axis, a hollow, tubular glass member having a closed end and an opposite open end, said member being inserted through said aperture and coaxial with said focal axis such that the open end thereof is disposed adjacent the apex aperture, connecting fusion means sealingly attaching said hollow tubular glass member integrally with said parabolic glass wall at the apex aperture region thereof, said tubular glass member including an energy absorbing surface thereon extending over substantially the entire surface area thereof disposed along the focal axis of said parabolic wall, a transparent glass cover member for covering the open end of said parabolic wall opposite the aperture thereof, and means for sealingly connecting the glass cover plate over said parabolic glass wall closing the parabolic chamber defined thereby, said chamber being evacuated to at least a partial vacuum.

2. The solar collector apparatus of claim 1, wherein the fusion connecting means for attaching the tubular glass member in said apex aperture comprises a glass-to-glass seal between said tubular member and the glass wall.

3. The solar collector apparatus of claim 1, wherein the said reflective coating on the parabolic surface of said wall comprises a specular reflective surface.

4. The solar collector apparatus of claim 1, wherein the energy absorbing surface on said tubular glass member is disposed at least over the exterior surface of said tubular member disposed along said focal axis and within said parabolic surface, whereby said energy absorbing surface is in the chamber that is evacuated to a vacuum condition.

5. The solar collector apparatus of claim 4, wherein said energy absorbing surface comprises a wave length selective coating on the exterior surface of said tubular member.

6. The solar collector apparatus of claim 5, in which said wave length selective coating is characterized by having the properties of more than 0.8 absorption in wave lengths above 2.5 microns and less than 0.1 emission in wave lengths of 2.5 microns and less.

7. A solar collector apparatus comprising an endless glass wall forming a parabolic surface disposed about a central focal axis and having a rim edge at one end thereof defining an enlarged opening and an annular hollow yoke portion at the other end thereof extending outwardly beyond the apex of said parabolic surface that is concentric on said focal axis and open at its opposite axial ends, the yoke providing an aperture in said parabolic surface,

- a hollow, tubular glass member having a closed end and an opposite open end, said member being inserted through said aperture and disposed in said yoke and coaxial with said focal axis such that the open end thereof extends beyond said apex aperture,
- a fusion means for annularly sealingly connecting the hollow tubular glass member and said glass wall,
- a reflective coating over the parabolic surface of said wall for reflecting solar radiation striking said surface to said focal axis,
- said tubular glass member including an energy absorbing surface thereon extending over substantially the entire surface area thereof disposed along the focal axis within said parabolic wall,
- a transparent glass cover member for covering the open end of said parabolic wall opposite the aperture thereof,
- means for sealingly connecting the glass cover plate about the rim edge of said parabolic glass wall closing the parabolic chamber defined thereby, said chamber being evacuated to at least a partial vacuum,
- a manifold providing a conduit for flow of working fluid, said manifold including means for sealingly connecting said open end of the hollow tubular glass member to the manifold whereby the hollow tubular member is in communication with said conduit, and
- means for introducing working fluid from the manifold conduit internally of the tubular member in heat exchange relation therewith and returning the solar energy laden working fluid to said manifold conduit.

8. The solar collector apparatus of claim 7, wherein the means for introducing working fluid from the manifold conduit into the hollow tubular member and return to the manifold conduit comprises a partition member in said conduit and extending into said tubular member, said partition member blocking flow in said conduit and bisecting the interior of said tubular member, whereby flow of working fluid in the manifold on one side of said partition member is diverted for counterflow along the interior wall of the tubular member and return to the manifold on the other side of the partition member.

9. The solar collector apparatus of claim 8, in which the working fluid is a gas.

10. The solar collector apparatus of claim 7, wherein the means for introducing working fluid from the manifold into said tubular member comprises a longitudinal wall means dividing the manifold conduit into two substantially parallel passageways, an aperture in the manifold connected to one of the passageways and receiving the yoke portion of the glass wall member, a delivery tube axially disposed through said manifold aperture and connected to the other of the passageways, said delivery tube extending internally of said tubular member and spaced from the closed end thereof, whereby flow of working fluid in the other of the passageways of the manifold is conducted through said delivery tube into and through the interior of said tubular member in a counterflow pattern and into the one passageway of the manifold, the working fluid being heated by the flow in the tubular member.

11. The solar collector apparatus of claim 10, in which the working fluid is a liquid.

12. The solar collector apparatus of claim 7, including a layer of thermal insulating material encasing the manifold.

13. The solar collector apparatus of claim 12, in which the thermal insulating material on the manifold comprises a layer of foamed polyurethane.

14. The solar collector apparatus of claim 7, wherein the means sealingly connecting the yoke to the manifold comprises an annular aperture in the manifold wall connected to the conduit thereof, said yoke portion being inserted into the aperture, and annular gasket means encircling said yoke compressed in the aperture between the yoke and the manifold wall.

15. The solar collector apparatus of claim 7, in which the reflective coating is characterized by being a specular coating of a metal and the energy absorbing surface of the tubular glass member comprises a wave length selective coating on the exterior surface of said tubular glass member, said selective coating having properties of absorption of more than 0.8 in wave lengths above 2.5 microns and emission of less than 0.1 in wave lengths of 2.5 microns and less.

16. The solar collector apparatus of claim 7, in which the means annularly sealingly connecting the hollow tubular glass member and said glass wall comprises a glass-to-glass fusion connection of said glass tubular member and said glass wall adjacent said aperture end of the yoke portion thereof, thereby sealing the apex aperture end of the parabolic chamber.

17. The solar collector apparatus of claim 16, wherein the tubular member includes an annularly outwardly flared portion thereon at an intermediate axial location to provide an outer cross dimension thereof at least equal to the cross dimension of the apex aperture, the glass of said flared portion being fused with the glass of said glass wall around the apex aperture thereof.

18. The solar collector apparatus of claim 7, in which a portion of the glass of said hollow tubular member is fused with the glass of the interior of the yoke, thereby providing a glass-to-glass seal between said tubular member and the said glass wall in the yoke portion thereof.

* * * * *

UNITED STATES PATENT AND TRADEMARK OFFICE
CERTIFICATE OF CORRECTION

PATENT NO. : 4,048,983
DATED : Sept. 20, 1977
INVENTOR(S) : Yu Kun Pei

It is certified that error appears in the above-identified patent and that said Letters Patent are hereby corrected as shown below:

Col. 3, Line 25, "of" should be -- by --.

Col. 4, Line 32, "10" should be -- 30 --.

Col. 6, Line 33 (Claim 1), "connecting fusion" should be -- fusion connection --.

Signed and Sealed this

Thirteenth Day of June 1978

[SEAL]

Attest:

RUTH C. MASON
Attesting Officer

DONALD W. BANNER
Commissioner of Patents and Trademarks